March 17, 1964  G. S. WING ETAL  3,124,908
APPARATUS FOR FINISHING THE EXTERNAL SURFACE OF EXTENDED BODIES
Filed Dec. 27, 1962  2 Sheets-Sheet 1

INVENTORS:
GEORGE S. WING,
HARRY L. BOCHMAN JR.
BY
ATTORNEYS.

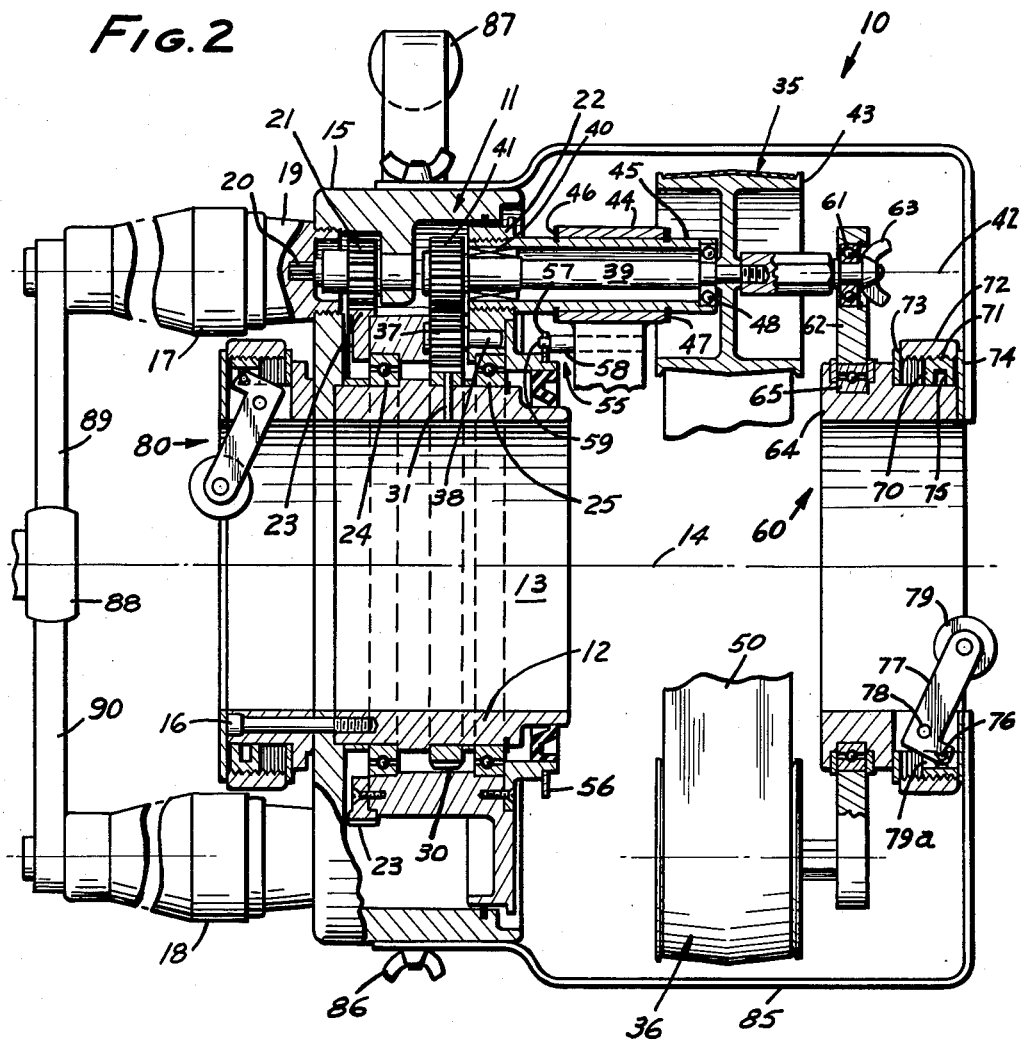

United States Patent Office 3,124,908
Patented Mar. 17, 1964

3,124,908
APPARATUS FOR FINISHING THE EXTERNAL SURFACE OF EXTENDED BODIES
George S. Wing, Palos Verdes Estates, and Harry Louis Bochman, Jr., Seal Beach, Calif., assignors to Hi-Shear Corporation, Torrance, Calif., a corporation of California
Filed Dec. 27, 1962, Ser. No. 247,706
6 Claims. (Cl. 51—140)

This invention relates to a polisher for polishing the external surface of an elongated, cylindrical body, such as tubing, rod, or bar.

This application is a continuation-in-part of applicant's co-pending patent application, Serial No. 78,650, filed December 27, 1960, which issued as Patent No. 3,071,903, dated January 8, 1963 entitled "Tube Polisher," both of which are assigned to the same assignee.

There is a continuing need for devices which are capable of polishing the external surfaces of bodies such as tubing or rod, which devices are readily portable, and quickly and expeditiously applied to the body being polished. There is an additional need for such a device to polish bodies of indefinite length, rather than merely the regions near the ends of these bodies.

It is an object of this invention to provide a relatively lightweight, easily portable, readily usable device for the above applications.

A polisher according to this invention includes a hub which has a hub axis, and a hub gear mounted on the hub. A drive plate is journaled to the hub and carries an intermediate gear and a spindle shaft. A spindle gear is mounted to the spindle shaft to turn with the same. The spindle gear and the hub gear are both meshed with the intermediate gear, whereby relative rotation of the hub and drive plate causes rotation of the spindle shaft around its own axis and also around the hub axis.

A drive pulley is pinned to the spindle shaft. A support arm is journaled to the drive plate and is rotatable around the spindle axis. An idler pulley is supported by the support arm at a position laterally displaced from the drive pulley. A flexible, abrasive belt is wrapped around the said pulleys and is driven by the drive pulley. Adjustment means interlink the support arm and the drive plate for adjusting the angular position of the support arm and thereby the spacing of the belt relative to the hub axis. Drive means mounted to the hub rotate the drive plate relative to the hub and thereby cause the belt both to rotate around the body being polished and to be driven at a surface speed in excess of that which it would have were it not driven by the drive pulley.

Guide means is provided for guiding the body to be polished relative to the belt.

According to a preferred but optional feature of the invention, the hub has an axial passage therethrough, which enables the device to be passed along a body of indefinite length.

According to still another preferred but optional feature of the invention, there is provided a pair of spindles and associated elements, so that the drive plate and the devices it mounts are statically and dynamically balanced around the hub axis.

The above and other features of this invention will be fully understood from the following detailed description and the accompanying drawings in which:

FIG. 2 is a side elevation, partly in cutaway cross-section of the presently preferred embodiment of the invention.

Figure 1:
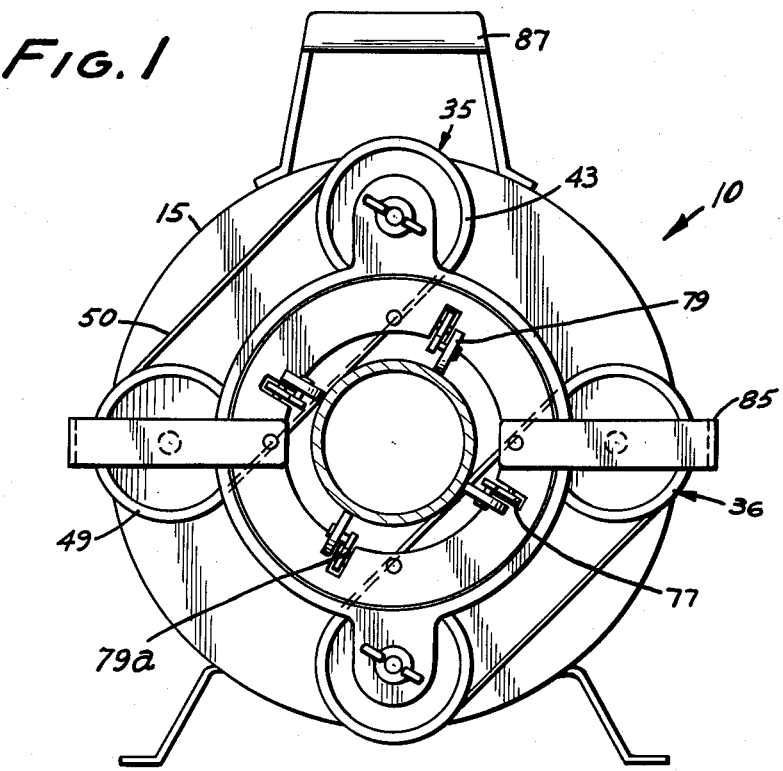
FIG. 1 is a right-hand end view of FIG. 2.
Figure 3:
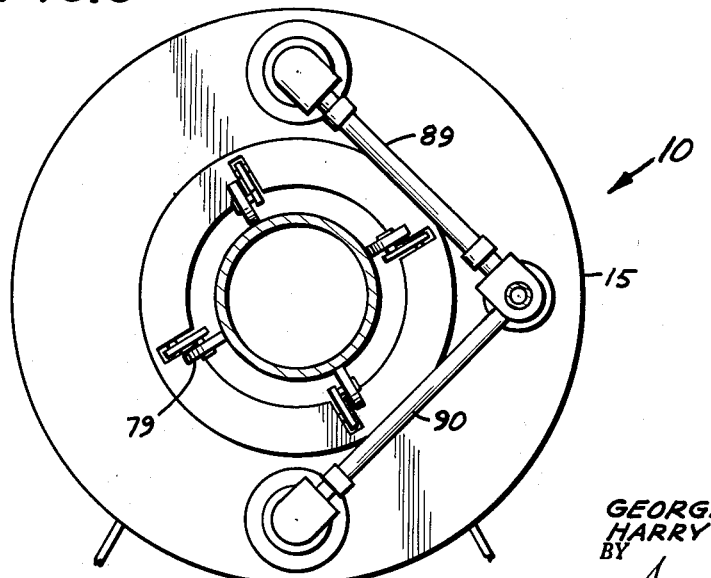
FIG. 3 is a left-hand view of FIG. 2.

FIG. 2 illustrates the presently preferred embodiment of polisher 10 according to the invention. This polisher includes a hub 11 having a central portion 12 with a hub passage 13 therethrough. The passage is centered on hub axis 14. A peripheral portion 15 of the hub is mounted thereto by bolts 16.

A pair of drive motors 17, 18 is mounted to the hub. Only drive motor 17 is shown in detail, drive motor 18 and its connections being identical. Drive motor 17 includes a frame 19 mounted by means such as threads to the hub, and a rotary power shaft 20 which has a power gear 21 pinned to its free end.

The power gears of both motors are engaged to a drive plate 22 by being meshed with a peripheral gear 23 on the drive plate. A pair of bearings 24, 25 journal the drive plate to the hub, so that operation of the drive motors turns the drive plate relative to the hub by virtue of the engagement of gears 21 and 23.

A hub gear 30 is fixed to and surrounds the hub. Conveniently, it may be attached to the hub by one or more dowels 31.

Means 35, 36 is provided for polishing the external surface of a body brought within the device. Only means 35 is shown in detail, it being understood that in this device, two of such means are provided, 180° apart, so as to statically and dynamically balance the device, as well as simultaneously to polish opposite sides of the body. Means 35 includes an intermediate gear 37 journaled to the drive plate by stud shaft 38.

A spindle shaft 39 is journaled to the drive plate by needle bearing 40. To its left-hand end in FIG. 2, there is fixed a spindle gear 41. The spindle gear and spindle are coaxial along axis 42 which axis is parallel to hub axis 14. Hub gear 30, intermediate gear 37 and spindle gear 41 are meshed, so that relative rotation between the hub and the drive plate causes the spindle shafts to rotate both on their own axis and also around the hub axis.

A drive pulley 43 is attached to the spindle shaft near its end. A support arm 44 is mounted to a support post 45, which support post is threaded into the drive plate. A pair of retainer rings 46, 47 hold the support arm in place on the support post. The support arm is rotatable around spindle axis 42. A bearing 48 is interposed between the support post and the spindle shaft, enabling the spindle shaft to rotate freely on the support post. The support arm makes a loose frictional fit with the support post so that it can rotate as described.

The support arm extends to support a driven pulley 49 (FIG. 1) whose axis of rotation is parallel to and laterally displaced from that of the drive pulley. A flexible, abrasive belt 50 is wrapped around the drive and driven pulleys, and is driven by the spindle shaft.

Adjustment means 55 is provided for adjusting the angular position of the support arm, and thereby the spacing between the flexible, abrasive belt and the hub axis. This comprises an adjustment ring 56 which is rotatably fitted to the hub and which has a pair of notches 57, one for each support arm, only the notch associated with means 35 being shown. The notches are disposed 180° apart on this ring. A link 58 is attached to each support arm and has a depending stud 59 which fits into respective notches 57, so that rotation of adjusting ring relative to the hub moves the link relative to the hub and thereby swings the adjusting arms. The adjusting ring may be held in an adjusted position relative to the hub by set screws or other tightening devices (not shown).

Guide means 60 is supported on the ends of the two spindle shafts. Each spindle shaft carries a bearing 61 which in turn is journaled within a follower ring 62. The internal race of the bearing is held to the spindle shaft by a wing nut 63. A support plate 64 is held by bearing 65 to follower ring 62, thereby giving free rotational freedom to the guide means relative to the drive plate, so that the guide means may remain stationary as the drive plate and the abrasive means rotate around the hub axis.

An adjuster 70 surrounds the support plate and has external threads 71. An exterior adjustment nut 72 engages threads 71. Both the nut and adjuster are held in place between end plates 73, 74. Therefore, turning adjustment nut 72 will axially shift adjuster 70. Adjuster 70 has an internal groove 75 which receives a pin 76 on one end of an arm 77 which is pinned by pin 78 to the support plate. The other end of the arm carries a contact wheel 79 adapted to contact the body to be polished. The arm projects into a slot 79a in the adjuster, and keeps the adjuster from turning with the adjuster nut. As can be best seen in FIG. 1, a plurality of arms and wheels is provided to give ample side support to the device.

A similar guide means 80 is provided on the opposite side of the hub from guide means 60 which includes an adjuster with external threads, an adjustment nut, end plates, groove, pins, arms and contact wheels as aforesaid, which for convenience bear the same reference numerals. The guide means 80 is held to the hub by bolts 81.

A guard 85 is attached by means such as wing nuts 86 to the peripheral portion of the hub, and a handle 87 may similarly be attached to the hub.

The motors may be air-powered types, and in order that more than one may be used simultaneously in air line, manifold 88 is provided with branches 89, 90 to the two individual motors.

The operation of the device should be evident from the foregoing and the drawings. The two sets of guide means are initially set to fit to the body to be polished by turning the adjustment nuts until the internal spacings between the contact wheels are properly spaced apart. In this case, all of the contact wheels of each guide means will move toward and away from the axis simultaneously so that the device is inherently a centering type.

The adjustment means for the support arms is adjusted by releasing the set screw and turning the adjustment ring until the support arms are in approximately the correct position. Flexible belts of the type used for devices of this class may be such as No. 120, Type 6 Carborundum, Resin Industrial Cloth, size 2″ x 20″ long, which has sufficient stretch that it can conveniently bend and embrace a small portion of the periphery of the object being polished, and can readily be sprung over the object as it is being passed axially toward the hub so as to exert side pressure on it.

The device is started in operation by turning on the motors, so that their drive gears turn the drive plate relative to the hub. This causes the intermediate gear to operate the spindle gear at a rate determined by the gear ratios and the motor speed. The spindle gear rotates both around its own axis and also around the hub axis, driving the flexible belt and also rotating it around the object being polished. When the device is provided with a passage through the hub, which is not an essential limitation of the invention, the additional advantage of the invention is attained that objects of indefinite length may be polished because there is no impediment to passage of the tool along the body.

This invention thereby provides a simple and portable device for polishing elongated bodies.

This invention is not to be limited by the embodiment shown in the drawings and described in the description which is given by way of example and not of limitation, but only in accordance with the scope of the appended claims.

We claim:

1. A polisher for polishing the external surface of an elongated, cylindrical body, comprising: a hub having a hub axis; a hub gear immovably mounted on said hub; a drive plate journaled to the hub; an intermediate gear journaled to the drive plate; a spindle shaft having a shaft axis parallel to the hub axis and journaled to the drive plate; a spindle gear mounted to the spindle shaft to turn with the same, the spindle gear and hub gear meshing with the intermediate gear, whereby relative rotation of the hub and drive plate causes rotation of the spindle shaft around its own axis, and around the hub axis; a drive pulley pinned to the spindle shaft; a support arm journaled to the drive plate and rotatable around the spindle axis; an idler pulley supported by said support arm; a flexible, abrasive belt wrapped around said pulleys and driven by the drive pulley; adjustment means interlinking the support arm and the drive plate for adjusting the angular position of the support arm and thereby the spacing of the belt relative to the hub axis; drive means mounted to the hub for rotating the drive plate relative to the hub; and guide means mounted to the hub for centering a body to be polished on the hub axis.

2. A polisher according to claim 1 in which two sets of said intermediate and spindle gears, spindle shaft, driven and drive pulleys, belt, and support arm provided symmetrically around the hub axis, whereby the device is rotationally balanced.

3. A polisher according to claim 1 in which the hub has an axial passage therethrough for passing the body to be polished, whereby bodies of indefinite length can be polished by it.

4. A polisher according to claim 3 in which a pair of said guide means is provided, said means being axially spaced apart.

5. A polisher for polishing the external surface of an elongated, cylindrical body, comprising: a hub having an axis and an axial passage therethrough; a hub gear encircling and fixed to the hub; a drive plate journaled to the hub; a pair of intermediate gears journaled to the drive plate and meshed with the hub gear; a pair of spindle shafts, each having an axis and being journaled to the drive plate; a pair of spindle gears, one fixed to each of the spindle shafts, both being meshed with a respective intermediate gear; a pair of drive pulleys, one fixed to each of the spindle shafts in order to be driven thereby; a pair of support arms journaled to the drive plate, each support arm being rotatable around a respective spindle shaft axis; a pair of driven pulleys, each being journaled to a respective support arm and laterally spaced from a respective drive pulley; a pair of flexible, abrasive belts, each being wrapped around a drive and a driven pulley associated with a respective spindle shaft; a motor having a frame, a rotary power shaft, and a power gear, the frame being fixed to the hub and the power gear engaging the drive plate to rotate the same; adjustment means for adjusting the angular position of the support arm comprising a ring mounted to the hub, a link on each support arm engaging the ring, whereby rotation of the ring relative to the hub shifts the links relative to the hub and changes the angular position of the support arms; and guide means mounted to the hub for centering a body to be polished on the hub axis.

6. A polisher according to claim 5 in which a pair of said motors is provided, both driving the drive plate.

References Cited in the file of this patent

UNITED STATES PATENTS

| | | |
|---|---|---|
| 961,969 | Klingloff | June 21, 1910 |
| 2,434,769 | Jones | Jan. 20, 1948 |
| 2,665,530 | Deffenbaugh | Jan. 12, 1954 |
| 2,801,497 | Moseley | Aug. 6, 1957 |
| 3,071,903 | Wing et al. | Jan. 8, 1963 |

FOREIGN PATENTS

| | | |
|---|---|---|
| 137,689 | Great Britain | Jan. 22, 1920 |
| 255,664 | Italy | Oct. 31, 1927 |
| 403,300 | Germany | Sept. 26, 1924 |
| 613,172 | France | Oct. 14, 1926 |